(12) United States Patent
Miller

(10) Patent No.: US 10,487,300 B2
(45) Date of Patent: Nov. 26, 2019

(54) PICK UP TUBE ASSEMBLY USEFUL FOR FLUID TRANSFER INCLUDING LIQUID TRANSFER IN ALCOHOLIC BEVERAGE BREWING OPERATIONS

(71) Applicant: George W. Miller, Hastings, MN (US)

(72) Inventor: George W. Miller, Hastings, MN (US)

( * ) Notice: Subject to any disclaimer, the term of this patent is extended or adjusted under 35 U.S.C. 154(b) by 438 days.

(21) Appl. No.: 14/949,092

(22) Filed: Nov. 23, 2015

(65) Prior Publication Data
US 2016/0145551 A1    May 26, 2016

Related U.S. Application Data

(60) Provisional application No. 62/082,870, filed on Nov. 21, 2014.

(51) Int. Cl.
| | | |
|---|---|---|
| F17D 1/08 | (2006.01) | |
| C12C 13/02 | (2006.01) | |
| C12C 7/20 | (2006.01) | |

(52) U.S. Cl.
CPC .............. *C12C 13/02* (2013.01); *C12C 7/20* (2013.01)

(58) Field of Classification Search
CPC ........... C12C 13/02; C12C 13/10; C12C 7/20; B67D 1/00; F16L 5/10
USPC .......... 137/590, 212, 315.07, 383, 384, 592; 285/136.1, 232, 239, 245, 255, 256, 357, 285/369, 392, 397, 423, 32, 80, 110, 113, 285/137.11, 212, 222, 235; 210/462, 463
See application file for complete search history.

(56) References Cited

U.S. PATENT DOCUMENTS

| | | | | |
|---|---|---|---|---|
| 2,788,992 A | * | 4/1957 | De Vienne ............ | F16L 19/065 285/136.1 |
| 3,104,899 A | * | 9/1963 | McKenzie .............. | F16L 19/14 285/343 |
| 3,430,990 A | * | 3/1969 | Nelson ................... | F16L 19/061 277/606 |
| 3,438,655 A | * | 4/1969 | Campbell ............. | F16L 19/083 285/143.1 |
| 3,711,126 A | * | 1/1973 | Hara ....................... | H01P 1/042 285/116 |
| 4,031,916 A | * | 6/1977 | Camerano ........... | F24D 19/0004 137/561 A |
| 4,395,060 A | * | 7/1983 | Lapham ................ | F16L 19/075 285/231 |
| 4,492,392 A | * | 1/1985 | Woods .................. | F16L 41/086 285/119 |
| 4,512,899 A | * | 4/1985 | Goodnight, Jr. .... | G01N 30/6039 210/198.2 |
| 5,311,811 A | * | 5/1994 | Kuzyk ................. | C12G 1/0206 210/242.1 |

(Continued)

OTHER PUBLICATIONS

Prior Art Fig. 1 of filed provisional application U.S. Appl. No. 62/082,870, filed Nov. 21, 2014, 1 page.

(Continued)

*Primary Examiner* — Minh Q Le
(74) *Attorney, Agent, or Firm* — Kagan Binder, PLLC

(57) ABSTRACT

The present invention relates to a plumbing connection useful in the field of fluid transfer, including in many stages of beer brewing operations, to connect to a fluid inlet or outlet in which the plumbing connection includes a threaded, compressible bushing that compressibly grips a tube when tightened to make a plumbing connection.

17 Claims, 5 Drawing Sheets

Fig. 3

(56) References Cited

U.S. PATENT DOCUMENTS

| | | | | |
|---|---|---|---|---|
| 5,433,487 | A * | 7/1995 | Kuhn | F16L 5/08 |
| | | | | 285/136.1 |
| 7,677,602 | B2 * | 3/2010 | Bennett | F16L 19/10 |
| | | | | 285/249 |
| 7,963,213 | B1 * | 6/2011 | Murdock | C12C 13/10 |
| | | | | 99/322 |
| 8,146,484 | B2 * | 4/2012 | Blichmann | B01D 43/00 |
| | | | | 210/515 |
| 8,337,228 | B1 * | 12/2012 | Montena | H01R 13/5219 |
| | | | | 277/609 |
| 8,481,100 | B2 * | 7/2013 | Blichmann | C12C 13/10 |
| | | | | 426/29 |
| 2005/0285391 | A1 * | 12/2005 | Chelchowski | F16L 19/065 |
| | | | | 285/255 |
| 2013/0280670 | A1 * | 10/2013 | Edgren | A61C 7/22 |
| | | | | 433/19 |
| 2018/0045619 | A1 * | 2/2018 | Kocher | G01N 1/2226 |

OTHER PUBLICATIONS

Prior Art Fig. 2 of filed provisional application U.S. Appl. No. 62/082,870, filed Nov. 21, 2014, 1 page.
Prior Art Pig. 3 of filed provisional application U.S. Appl. No. 62/082,870, filed Nov. 21, 2014, 1 page.

* cited by examiner

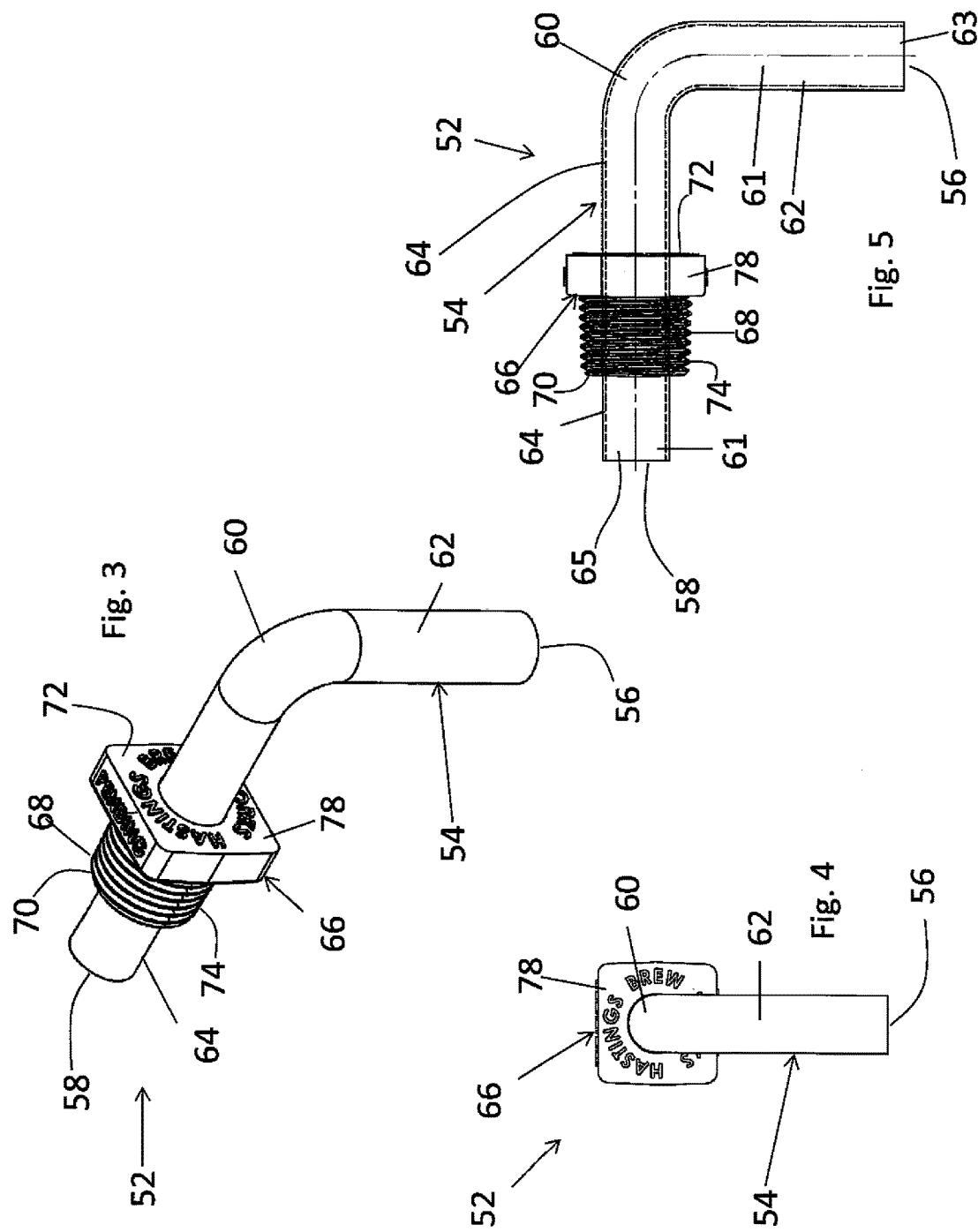

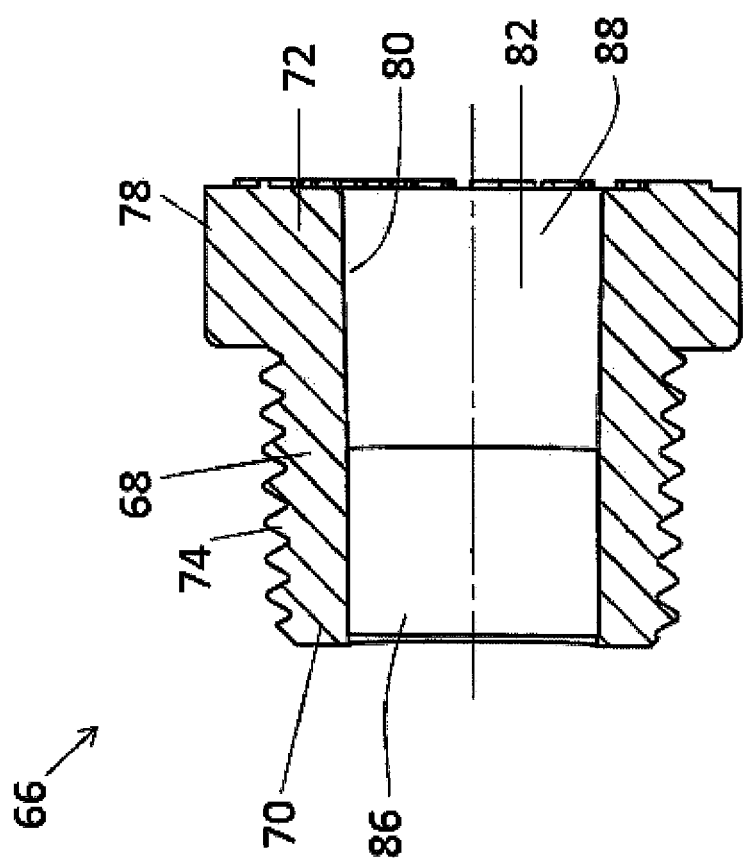

PICK UP TUBE ASSEMBLY USEFUL FOR FLUID TRANSFER INCLUDING LIQUID TRANSFER IN ALCOHOLIC BEVERAGE BREWING OPERATIONS

PRIORITY CLAIM

This application claims priority to U.S. Provisional Patent Application No. 62/082,870, filed Nov. 21, 2014, the entire contents of which are incorporated herein by reference in their entirety.

FIELD OF THE INVENTION

The present invention is in the field of plumbing connections that connect to fluid inlets and outlets of fluid holding vessels. More particularly, the present invention relates to a plumbing connection useful in the field of beer brewing to connect to a fluid inlet or outlet in which the plumbing connection includes a threaded, compressible bushing that compressibly grips a tube when tightened to make a plumbing connection.

BACKGROUND OF THE INVENTION

Many consumer and industrial processes involve transferring fluids to and from vessels in which the liquids are stored, reacted, modified, or otherwise handled. Typically, inlet and outlet plumbing components are connected to a vessel in order to feed or withdraw fluids from the vessel. In order to create fluid tight couplings, these coupling structures can be quite complex, involving several tubes or pipes, coupling elements, valves, gaskets, and the like. Manufacture, installation, adjustment, positioning, repair, cleaning and sanitizing, and use are more difficult than desired when so many components are involved.

The process of brewing beer, either on a commercial or home brewing scale, is an illustrative context in which plumbing components are connected to inlets and outlets of several processing vessels. Typically, beer brewing involves process steps such as malting, milling, mashing, lautering, boiling, fermenting, conditioning, filtering, and packaging. For example, the boiling step typically occurs in a kettle. Ingredients often including water, one or more sugar sources including malted barley, and hops, are boiled to accomplish objectives including sterilization of the wort to remove unwanted bacteria, releasing of hop flavors, stopping enzymatic processes, precipitation of proteins, volatilize off-flavors, and concentration of the wort.

At the end of the boil, the kettle generally includes the desired liquid phase and a solid phase referred to as the trub. A whirlpool effect may be used to collect solids in the bottom center region of the kettle, while the desired liquid product is drained from the perimeter of the kettle. A kettle generally includes a drain conduit to drain the liquid. A valve typically is provided outside the kettle to open and close the drain. A drain system includes a pickup tube or other inlet structure through which the liquid enters the drain system.

Kettles marketed for home brewing are supplied with a drain structure included threaded bosses on the inside and outside of the kettle. The bosses are used to connect the desired plumbing components. It is desirable that the plumbing connections at the drain are fluid-tight so that the kettle does not leak. Examples of commercially available brew kettles with such drain fittings are available under trade designations MegaPot 1.2 and Polar Ware.

A common practice in home brewing is to attach a pick up tube to the inside of the kettle drain for withdrawing the liquid. Conventional practice involves using coupling components, gaskets, and the like to make the plumbing connection. This involves many components to install. The large number of components to connect makes installation, cleaning and sanitizing, use, adjustment, and removal more cumbersome than might be desired. Home brewers actively investigate better ways to couple interior drain components to the drain of a brew kettle. Another concern is to use a pick up strategy that drains as much of the liquid as practically feasible while leaving as much of the solids behind.

For example, a current beer brewing blog is at www.morebeer.com. Blog participants have discussed strategies for devising a better pick up to attach to the drain boss on a brew kettle. In one discussion, a blog participant described a pick up strategy in which a pick up tube is coupled to the drain boss with a 90 degree elbow. The pick-up tube is aimed sideways. The participant wanted a better strategy, as this one left 1.5 gallons behind in the kettle. The same participant later modified this strategy by aiming the tube downward, but still used the 90 degree elbow and plumbers tape at the connections.

Another blog participant used a threaded coupling, a 90 degree elbow and a tube aimed sideways. Connections between the components were soldered, making adjustment impractical. A gasketing material was used between the drain boss and the coupling.

The popularity of home brewing continues to increase. The demand for better fluid coupling strategies for brewing equipment such as boiling kettles remains strong.

SUMMARY OF THE INVENTION

The present invention is in the field of plumbing connections that connect to fluid inlets and outlets of fluid holding vessels. More particularly, the present invention relates to a plumbing connection useful in the field of beer brewing to connect to a fluid inlet or outlet in which the plumbing connection includes a threaded, compressible bushing that compressibly grips a tube when tightened to make a plumbing connection.

Embodiments of the present invention are easy to install and use. In one illustrative mode of practice, a tube is used to pick up liquid, e.g., wort, from inside a vessel such as a brew kettle, tank, cooler, reaction vessel, or the like. Initially, the tube is inserted into a compressible bushing with a press fit between the tube and bushing. The bushing is then screwed into a complementary coupling on the vessel. Tightening the bushing causes the bushing to increasingly grip the tube as well, as the coupling. As the bushing is tightened, the tube is rotated within the bushing to aim the tube into the interior volume of the vessel as desired. While holding the tube in the desired aim, the bushing is fully tightened to the degree desired. As a consequence, the tube is coupled to the tank with fluid tight seals between the bushing and the tube and between the bushing and the vessel. The bushing functions as the attachment component, the gripping component, and the gasket component.

In one aspect, the present invention relates to a brew kettle system, comprising:
 (a) a kettle comprising
  (i) an interior volume
  (ii) a boundary between the interior volume and an exterior region; and
  (iii) a conduit fluidly coupling the interior volume to the exterior region, wherein the conduit comprises a female-threaded portion threadably accessible from the interior volume and a second portion accessible from the exterior region; and (b) a pick up tube assembly, comprising:
(i) a compressible bushing, comprising:
a compressible body comprising male threads on at least a portion of an exterior surface of the compressible body, wherein the male threads of the compressible body are threadably engaged with the female threads of the female-threaded portion of the conduit; and
a through bore extending from a first end of the body to a second end;
(ii) a tube having a first port at a first end that opens toward the interior volume of the kettle and a second port at a second end that opens toward the exterior region, wherein at least a portion of the tube is positioned in the through bore of the compressible bushing, and wherein the compressible body is configured in a manner such that the threadable engagement between the conduit and the compressible bushing compresses the bushing body to cause the compressible body to compressibly and sealingly engage the tube portion that is positioned in the through bore.

In another aspect, the present invention relates to a method of fluidly coupling an interior volume of a kettle to and an exterior region, comprising the step of providing a kettle system according to the above.

In another aspect, the present invention relates to a method of heating a wort admixture, comprising the steps of:
(a) providing a kettle system according to claim 1;
(b) causing the wort admixture to be held in the kettle;
(c) while the wort admixture is held in the kettle, heating the wort; and
(d) after heating the wort, withdrawing at least a portion of the wort admixture through a fluid pathway comprising at least the tube portion that is compressibly and sealingly engaged by the compressed bushing body.

In another aspect, the present invention relates to a pick up tube assembly, comprising:
(a) a compressible bushing, comprising:
(i) a compressible body comprising male threads on at least a portion of an exterior surface of the compressible body, wherein the male threads of the compressible body are configured to threadably engage with the female threads of a female-threaded portion of a conduit accessible from an interior volume of a brew kettle; and
(ii) a through bore extending from a first end of the body to a second end;
(b) a tube having a first port at a first end that opens toward the interior volume of the kettle and a second port at a second end that opens toward the exterior region, wherein at least a portion of the tube is positioned in the through bore of the compressible bushing, and wherein the compressible body is configured in a manner such that a threadable engagement between the conduit and the compressible bushing compresses the bushing body to cause the compressible body to compressibly and sealingly engage the tube portion that is positioned in the through bore.

BRIEF DESCRIPTION OF THE DRAWINGS

FIG. 3 is a perspective view of a pick up tube assembly of the present invention used in the brew kettle system of FIG. 1.

FIG. 4 is a front view of the pick up tube assembly of FIG. 3.

FIG. 5 is a side view of the pick up tube assembly of FIG. 6 with the pick up tube shown in cross-section.

FIG. 8 is a side cross section view of the compressible bushing of FIGS. 6 and 7 in which the cross section is taken along line A-A of FIG. 7.

DETAILED DESCRIPTION

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Figure 1:
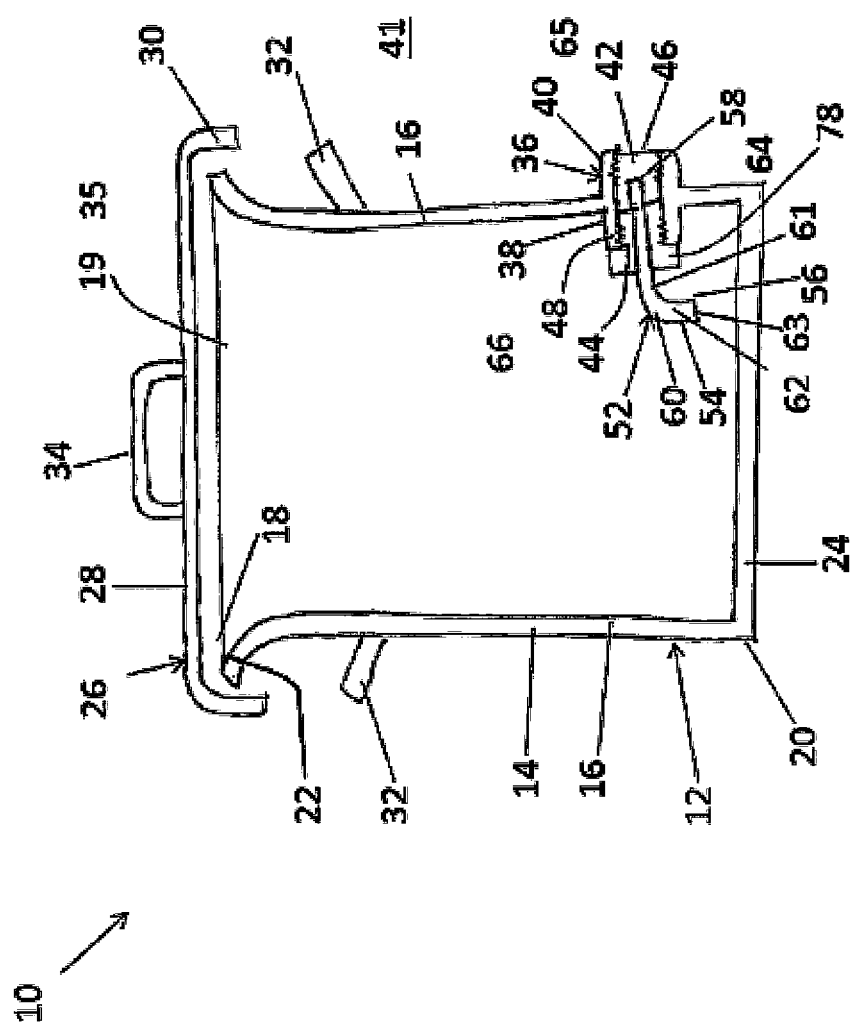
FIG. 1 is a schematic side view of a brew kettle system of the present invention shown in cross-section.
Figure 2:
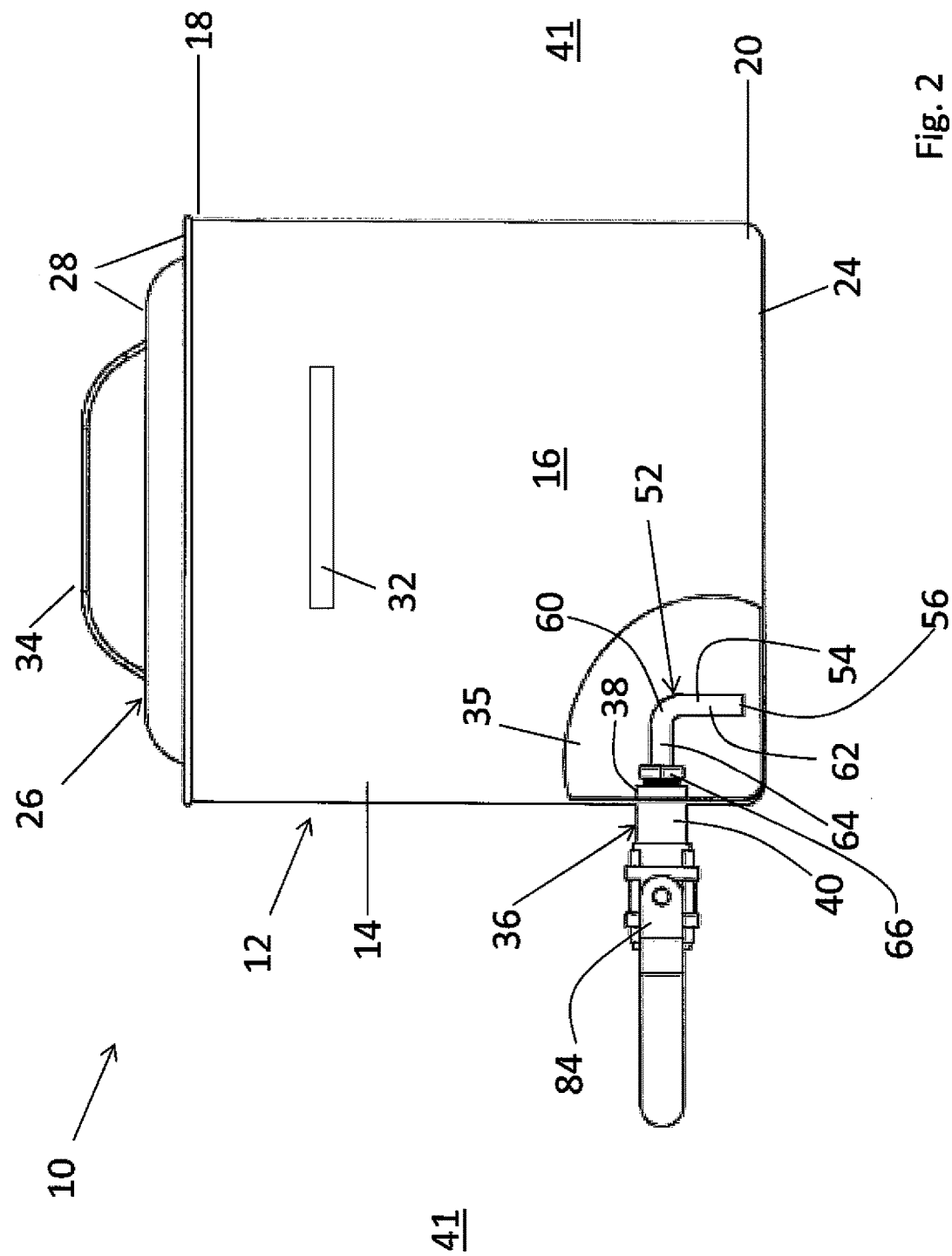
FIG. 2 is a side view of the brew kettle of FIG. 4 with a bottom portion of the brew kettle cut away to better show the drain features.
Figure 7:
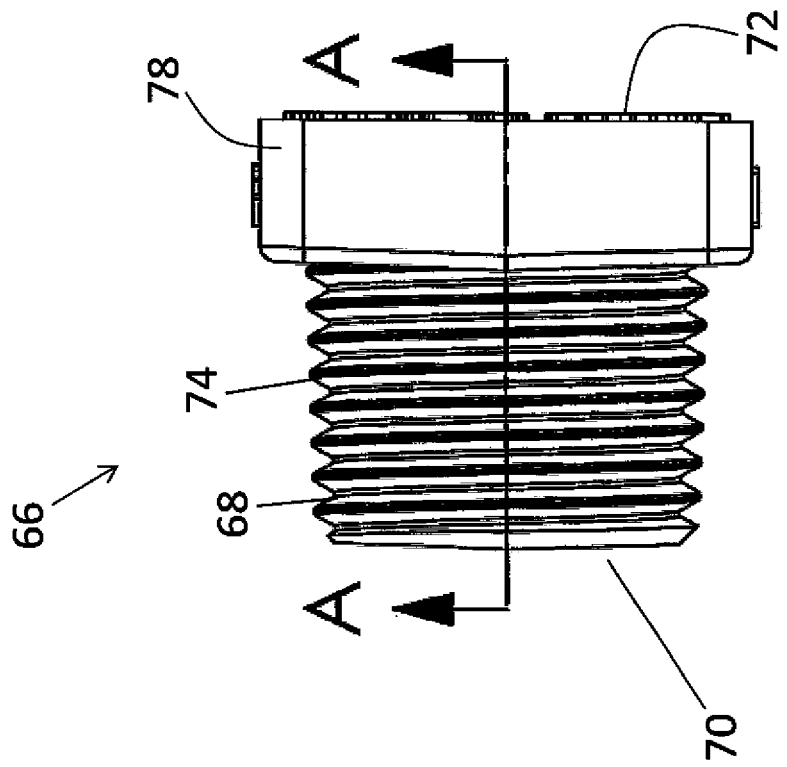
FIG. 7 is a side view of the compressible bushing shown in FIG. 6.
Figure 6:
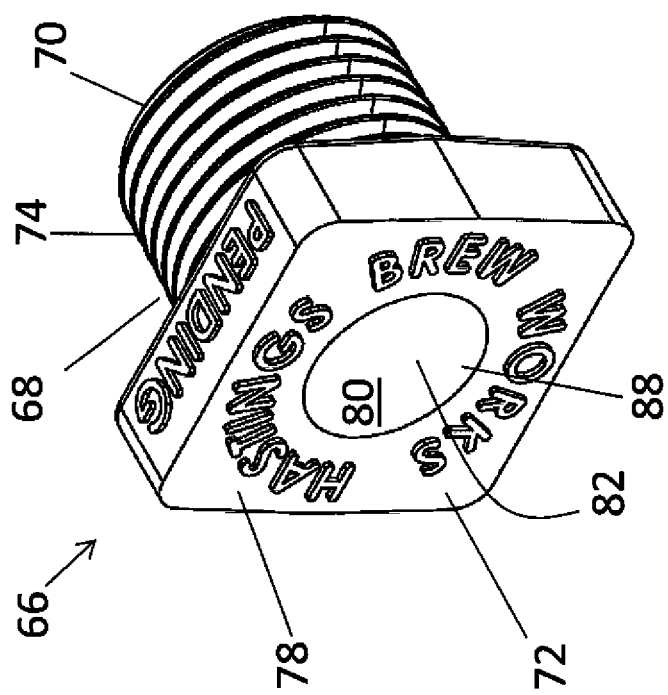
FIG. 6 is a perspective view of the compressible bushing used in the pick up tube assembly of FIG. 3.

An illustrative embodiment of a brew kettle system 10 of the present invention is shown in FIGS. 7 through 8. Brew kettle system 10 generally includes kettle 12 and a pick up tube assembly 52. Kettle 12 can be fabricated from a wide range of material(s). Kettle 12 desirably is fabricated from one or more materials suitable for heating wort (not shown) in the process of beer brewing. Suitable materials are strong and durable, chemically and physically resistant to the wort during heating, and are easy to clean and sterilize. Examples of suitable materials include stainless steel, aluminum, copper, brass, other metal or metal alloys, heat-resistant glass, combinations of these, and the like.

Kettle 12 includes tub 14 having a generally cylindrical sidewall 16, floor 24, and cover 26. Together, sidewall 16, floor 24, and cover 26 provide a housing enclosing interior volume 35. Although shown with a cylindrical geometry, sidewall 16 can have other geometries if desired. Sidewall 16 extends from top rim 18 to bottom rim 20. Top rim 18 flares outward to help stiffen sidewall 16. Top rim 18 defines an opening for accessing interior volume 35 of kettle 12. Handles 32 are attached to sidewall 16 to facilitate lifting, carrying, moving, tipping, holding, or otherwise handling kettle 12.

Floor 24 is attached to sidewall 16 proximal to bottom rim 20. Floor 24 can be a separate component from sidewall 16. Alternatively, floor 24 and sidewall 16 can be integrally formed as a single component. In this embodiment, floor 24 is general flat. In other embodiments, floor 24 can be convex, concave, corrugated, or otherwise contoured to help stiffen floor 24.

Cover 26 fits over top rim 64 of sidewall 16 and is removable on demand by simply lifting or lowering to open or close kettle 12 as desired. Cover 26 includes panel 28 extending across tub opening 19 and a flange 30 extending downward from panel 28 to fit around top rim 18. Cover 26 includes handle 34 to help the user hold cover 26. In many suitable embodiments, cover 26 simply sets down onto top rim 18 and is held in place by gravity. In other embodiments, cover 26 may be sized and/or include features that allow cover 26 to be secured in place onto tub 14. Examples of securing options include snap fit engagement, threaded engagement, latches, combinations of these, or the like. Because heating wort can generate pressure in the headspace above the wort, kettle 12 desirable is fitted with relief valve features (not shown) in those embodiments in which cover 26 is secured in some fashion to tub 14.

After heating wort to the desired degree, the wort is desirably removed from tub 12 and transferred to further apparatus to continue the brewing process. Rather than have to lift and tip kettle 12 to transfer the hot wort, it is more desirable and easier to drain the hot wort from a suitable fluid egress proximal to the floor of 24. Desirably, the intake for the fluid egress is positioned as close as possible to the floor 24 so that as much wort as practically possible is drained from kettle 12 and as little wort as practically possible is left behind. To this end, tub 14 includes fluid drain coupling 36 positioned on sidewall 16 proximal to floor 24. Fluid drain coupling 36 provides a fluid egress to allow fluid contents to be drained from and/or transferred into interior volume 35.

Fluid drain coupling 36 includes a tube boss 38 projecting into interior volume 35 and a tube boss 40 projecting outward into the exterior region 41 outside of kettle 12. A channel 42 extends from port 44 on interior tube boss 40 to port 46 on exterior tube boss 40. Channel 42 allows fluids to flow between interior volume 35 and exterior region 41. Tube boss 38 includes female threads 48 to allow pick up tube assembly to be easily coupled to tube boss 38. Similarly, boss 40 also desirably includes one or more coupling features (not shown) to allow plumbing components (not shown) to be coupled to boss 40. Examples of coupling features include male threads, female threads, barbs, band clamps, quick release fittings, hatches, valves, snap fittings, combinations of these, and the like.

As illustrated, brew kettle system 10 is shown as including one fluid drain coupling 36. In alternative embodiments, system 10 optionally may include one or more additional fluid drain couplings or other features to allow fluids to be transferred to and from kettle 12. Such optional fluid transfer features may be positioned at any location(s) such as on sidewall 16, floor 24, and/or cover 26.

Pick up tube assembly 52 includes a pick up tube 54 gripped by compressible bushing 66, which in turn is threadably engaged with tube boss 38. Pick up tube extends from first end 56 to second end 58. First end 56 is located inside interior volume 35. In this embodiment, second end 58 extends toward port 46 of boss 40.

Pick up tube has bend 60 with pick up arm 62 extending into interior volume 35 and drain arm 64 extending toward exterior region 41. Pick up tube 54 is hollow to provide a fluid flow channel 61 extending from a first port 63 to second port 65. When draining fluid from kettle 12, first port 63 serves as an inlet into pick up tube 54, and second port 65 serves as an outlet from pick up tube 54. As shown in the Figures, tube 54 is oriented so that pick up arm 62 is oriented downward toward floor 24. In other modes of practice, drain arm 64 can be rotated inside compressible bushing 66 in order to aim pick up arm 62 in an alternative direction, e.g., diagonally downward, to the side, diagonally upward, upward, or the like.

Compressible bushing 66 is threadably engaged with tube boss 38 and grips pick up tube 54. The threadable engagement with tube boss 38 occurs a manner such that the interface between tube boss 38 and bushing 66 is fluid tight. Similarly, compressible bushing 66 grips tube 54 also in a manner such that the interface between bushing 66 and tube 54 is fluid tight. In this manner, bushing 66 serves not only as a way to physically couple itself and tube 54 to tube boss 38, but also as a gasket to help create fluid tight seals. Consequently, fluid such as wort drains from tube 14 through pick up tube 54 and is substantially prevented from, more desirably completely prevented from, seeping out from tub 14 via the interfaces between the tube boss 38, bushing 66, and tube 54. The fluid tight seal at the interfaces is also important to facilitate a siphon action when such an action is desired for drawing fluid up into the pick up tube 54. The siphon action helps to maximize the amount of wort recovered from the brew kettle after heat treatment of the wort is completed. The siphon action is particularly important when the pick up arm 62 of the pick up tube 54 is aimed downward so that first port 63 is close to the bottom of the kettle 12 and where the level of the wort being withdrawn has dropped below bend 60.

Compressible bushing 68 includes a resiliently compressible body 68 extending from first end 70 to second end 72. The external surface 76 of body 68 includes male threads 74. The male threads 74 are threadably engaged with the female threads 48 inside tube boss 38. Head 78 is provided at first end 70. Head has a faceted external shape so that head can be gripped with a suitable tool, e.g., pliers, wrench, socket, or the like, to threadably engage or disengage bushing 68 with or from bore 38. Head 78 may be a separate component that is attached to body 68. More desirably, head 78 and body 68 are integrally formed as a single component.

Compressible bushing 68 is hollow and includes cylindrical interior wall 80 defining a channel 82 extending through bushing 68 from first end 70 to second end 72. When compressible bushing has not yet been threadably engaged with bore 38, channel 82 is sized so that drain arm 64 of pick up tube 54 can be inserted into or pulled from channel 82 with a snug but sliding fit. In the industry, this sometimes is referred to as a "press fit." A suitable fit is indicated when the tube arm 64 slides back and forth within channel 82 with light to moderate hand force manually applied without use of tools, but is snug enough so that the installed tube 54 does not fall out of compressible bushing 66 when pick up tube assembly 52 is shaken by hand prior to being threadably engaged with boss 38.

The cross-section of channel 82 may be constant from first end 70 to second end 72 or it may taper from one end to the other, or have some other smooth or undulating contour. More desirably, the cross section of channel 82 gently tapers from first end 70 to second end 72. By way of example, a suitable taper is in the range from 0.25 degrees to 5 degrees, preferably 0.5 degrees to 3 degrees, most preferably about 1 degree. In those embodiments including a taper, a suitable taper can be established based upon the outside diameter of drain arm 64. The opening 86 of channel 82 proximal to first end 70 desirably is just slightly larger than the outside diameter of arm 64. In some embodiments, the opening 86 is 0.003 inches to 0.03 inches, preferably 0.005 to 0.02, more preferably 0.007 to 0.015 inches larger in diameter than the outside diameter of drain arm 64. For example, in one embodiment, a difference of 0.015 inches was found to be suitable.

The taper is created by sizing the opening 88 at second end 72 to be equal to or slightly smaller in diameter than the outside diameter of drain arm 64 with an outside diameter of 0.5 inches. In some embodiments, opening 88 is 0.002 to 0.03 inches, preferably 0.003 to 0.01 inches smaller than the outside diameter of drain arm 64 having an outside diameter of 0.5 inches.

Body 68 is resiliently compressible. Resilient means that body 68 is able to at least partially and more preferentially substantially regain its original shape after being compressed elastically by threadable engagement with bore 38 for 5 minutes at 25° C. and the compression force is then removed by threadably removing body 68 from bore 38. Exemplary resiliently compressible materials may have one or more desirable characteristics. In some embodiments, a suitable resiliently compressible material has an elongation at break in the range of 100% to 400%, more preferably 200% to 350%, even more preferably 250% to 350% according to DIN 53504 Si. In one mode of practice, an elongation at break of 290% would be suitable. In some embodiments, a suitable resiliently compressible material has a hardness Shore A in the range from 50 to 90, preferably 60 to 80, more preferably 65 to 75 according to DIN 53505. In one mode of practice, a Shore A hardness of 70 would be suitable. In some embodiments, a suitable resiliently compressible material has a rebound elasticity of 55% to 90%, more preferably 65% to 80% according to DIN 53512. In one mode of practice, a rebound elasticity of 71% would be suitable. In some embodiments, a suitable resiliently compressible material has a tensile strength in the range from 5 $N/mm^2$ to 15 $N/mm^2$, preferably 6.5 $N/mm^2$ to 10.5 $N/mm^2$ according to DIN 53504 S 1. In one mode of practice, a tensile strength of 8.6 $N/mm^2$ would be suitable. In some embodiments, a suitable resiliently compressible material has a density in the range from 0.9 $g/cm^3$ to 1.3 $g/cm^3$, preferably 1.0 $g/cm^3$ to 1.2 $g/cm^3$ according to ISO 1183-1 A. In one mode of practice a density of 1.14 $g/cm^3$ would be suitable. In some embodiments, a resiliently compressible material has a tear-strength in the range from 15 N/mm to 35 N/mm, preferably 15 N/mm to 25 N/mm according to ASTM D 624 B. In one mode of practice, a tear strength of 21 N/mm would be suitable. An illustrative example of a resiliently compressible material having such characteristics is a silicone rubber having that is commercially available from Wacker Chemie AG under the Elastosil LR 3003/70 AIB trade designation.

A wide variety of resiliently compressible materials can be used to form body 66 as well as head 78 if desired. Exemplary materials include one or more rubbers, particularly one or more silicone rubbers. Silicone rubbers are elastomeric polymers generally are non-reactive, stable, and resistant to extreme environments and temperatures from −55° C. to +300° C. while still maintaining useful properties. Silicone rubber also is easy to sterilize and therefore is useful in the practice of brewing beer. More preferred embodiments of silicone rubber are suitable for food contact. More preferred silicone rubbers are approved for food contact use according to one or more of FDA Title 21 CFR 178.3292 and/or 21 CFR 166.2600. More preferred silicone rubbers further are approved for food contact use according to European Union (BfR) standards. The silicone rubber optionally may be used in combination with one or more other polymers. Additives also may be incorporated into the formulation to modulate properties. Examples of polymers include polyesters, polyurethanes, polyethers, polyamides, polyimides, fluorinated polymers, polyolefins, combinations of these, and the like. Examples of additives include inert fillers such as $TiO_2$, antioxidants, antistatic agents, fungicides, bactericides, heat stabilizers, coloring agents, stain inhibiting agents, plasticizers, stiffening agents, combinations of these and the like.

The compressible characteristics of body 68 are advantageous. When body 68 threadably engages female threads of bore 38, channel 82 is compressed over a wide surface area of drain tube arm 64. As a consequence, body 68 grips drain tube arm 64 tighter to create a fluid tight seal between the two components. At the same time, the threadable engagement compresses male threads 74 against female threads 48 around the surface area of body 68 to create a fluid tight seal between the components. Body 68 thus serves multiple purposes as a way to couple tube 54 to fluid drain coupling 36 and as a gasket for sealing purposes. This avoids the need for separate gaskets. Body 68 grips tube 54 so tightly, that separate coupling components typically used in conventional practices are not needed. Moreover, adjustment of how pick up arm 62 is aimed are easy to implement. Quite simply, body 68 is loosened from bore 38 to reduce the grip of body 68 on tube 54. This allows drain arm 64 to be rotated to aim pick up arm 62 in any desired direction. The body 64 is then re-tightened to securely grip tube 54 again. This is contrasted to the conventional approaches in which one or more coupling fixtures are involved in order to accomplish a similar adjustment.

Brew kettle system 10 is easy to set up and use for beer brewing. The components of kettle 12 and pick up tube assembly are cleaned and sterilized as appropriate. Pick up tube 54 is press fit into compressible bushing 66. Body 68 of bushing 66 is tightened into bore 38 with pick up arm 62 aimed in interior volume 35 as desired. A valve 84 or other suitable closure is closed so that liquid in kettle 12 is not able to drain through pick up tube assembly 52. The wort formulation is added to kettle 12, sometimes in stages, and boiled as desired. At the end of boiling, the valve or closure is opened to allow the heated wort to be drained from kettle 12 for subsequent processing. In a typical next stage of processing, the heated wort is optionally filtered and transferred to a cooling stage (not shown) to lower the temperature of the wort prior to downstream stages such as additional flavoring, fermentation, carbonation, etc.

The present invention has been described above with respect to boiling wort in a kettle system 10. Principles of the present invention can be practiced in any context where it is desired to drain fluid contents of a vessel via an easily manufactured, easily installed, easily adjusted, and easily used drain structure. For example, in brewing operations, principles of the present invention may be used to install a drain structure in a mash ton or a sparge/hot liquor tank. In chemical manufacturing, the structure can be used on reaction vessels to drain solvents, reaction products, etc. The structures also can be used to feed solvents, reactants, processing aids, etc. into a reaction vessel. The structures also can be used to add and remove solvents in liquid extraction units. The structures can be easily integrated into existing equipment to add fluid feed and fluid drain characteristics to a tank or other vessel.

All patents, patent applications, and publications cited herein are incorporated by reference as if individually incorporated. Unless otherwise indicated, all parts and percentages are by weight and all molecular weights are number average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:
1. A brew kettle system, comprising:
 (a) a kettle comprising
  (i) an interior volume
  (ii) a boundary between the interior volume and an exterior region; and
  (iii) a conduit fluidly coupling the interior volume to the exterior region, wherein the conduit comprises a first threaded portion comprising male or female threads and being threadably accessible from the interior volume and a second portion accessible from the exterior region; and (b) a pick-up tube assembly, comprising
  (i) a rotatably adjustable, compressible bushing that compressibly and threadably engages the first threaded portion of the conduit, the bushing comprising:
    a compressible body comprising threads on at least a portion of an exterior surface of the compressible body, wherein the complementary threads of the compressible body are threadably engaged with the threads of the first threaded portion of the conduit; and
    a through bore extending from a first end of the compressible body to a second end;
  (ii) a pick-up tube having a first port at a first end that opens toward the interior volume of the kettle and a second port at a second end that opens toward the exterior region, wherein the rotatably adjustable, compressible bushing connects the pick-up tube to the conduit, wherein at least a portion of the tube is positioned in the through bore of the compressible bushing, and wherein the compressible body is configured in a manner such that the threadable engagement between the conduit and the compressible bushing compresses the compressible bushing to causes the compressible body to compressibly and sealingly grip a surface area of the tube portion that is positioned in the through bore, wherein the compressible body, when compressibly and sealingly engaging the tube portion, creates a fluid tight seal between the compressible body and the surface area of the tube portion and between the compressible body and the conduit, and wherein the compressible bushing is rotatably adjustable to selectively tighten and loosen the grip of the bushing on the tube,
    wherein the through bore of the compressible bushing has a cross-section that tapers from the first end to the second end,
    wherein the through bore tapers at an angle in the range from 0.5 degrees to 3 degrees, and
    wherein the through bore is larger than the tube at the first end and is smaller than the tube at the second end.

2. The brew kettle system of claim 1, wherein the compressible bushing further comprises a faceted head.

3. The brew kettle system of claim 2, wherein the conduit is located proximal to the floor of the kettle.

4. The brew kettle system of claim 2, wherein the first end of the tube extends to the floor of the kettle.

5. The brew kettle system of claim 1, comprising a second conduit fluidly coupling the interior volume to the exterior region, wherein the conduit comprises a second threaded portion comprising male or female threads and being threadably accessible from the interior volume and a second portion accessible from the exterior region; and a second pick-up tube assembly comprising:
  (i) a second compressible bushing, comprising:
    a second compressible body comprising threads complementary to the threads of the second threaded portion on at least a portion of an exterior surface of the second compressible body, wherein the threads of the second compressible body are threadably engaged with the threads of the second threaded portion of the second conduit; and
    a second through bore extending from a first end of the body to a second end;
  (ii) a second tube having a first port at a first end that opens toward the interior volume of the kettle and a second port at a second end that opens toward the exterior region, wherein at least a portion of the second tube is positioned in the through bore of the second compressible bushing, and wherein the second compressible body is configured in a manner such that the threadable engagement between the second conduit and the second compressible bushing compresses the second compressible bushing to cause the compressible body to compressibly and sealingly engage the tube portion that is positioned in the through bore.

6. The brew kettle system of claim 1, wherein the tube has a bend with a pick-up arm extending into the interior volume and a drain arm extending toward the exterior region.

7. The brew kettle system of claim 6, wherein the pick-up arm is orientated downward towards a floor of the kettle.

8. The brew kettle system of claim 6, wherein the drain arm is rotatable inside the compressible bushing to aim the pick-up arm up, down, sideways, or diagonally within the interior volume when the compressible bushing is loosened on the first threaded portion of the conduit.

9. The brew kettle system of claim 1, wherein the threadable engagement between the conduit and the compressible bushing is fluid tight.

10. The brew kettle system of claim 1, wherein the engagement between the compressible bushing and the tube is fluid tight.

11. The brew kettle system of claim 1, wherein the compressible bushing comprises a silicone having an elongation at break in the range from 100% to 400%.

12. The brew kettle system of claim 1, wherein the compressible bushing comprises a silicone having a Shore A hardness in the range from 60 to 80.

13. The brew kettle system of claim 1, wherein the compressible bushing comprises a silicone having a rebound elasticity in the range from 65% to 80%.

14. A method of fluidly coupling an interior volume of a kettle to and an exterior region, comprising the step of providing a kettle system according to claim 1.

15. The brew kettle system of claim 1, wherein the compressible body is configured to at least partially regain its original shape after being compressed elastically by threadable engagement with the conduit for 5 minutes at 25° C. followed by a removal of a compression force by threadably removing the compressible body from the conduit.

16. The brew kettle system of claim 1, wherein the compressible body is configured to couple the tube to a fluid drain coupling, and wherein the compressible body is also configured to be a gasket for sealing purposes, avoiding the need for separate gaskets, wherein the compressible body grips tube so tightly that separate coupling components are not needed.

17. The brew kettle system of claim 1, wherein the compressible bushing compressibly grips the tube when tightened to make a plumbing connection, and wherein tightening the compressible bushing causes the compressible bushing to increasingly grip both the tube and the conduit.

* * * * *